United States Patent [19]

Peters et al.

[11] 4,081,589
[45] Mar. 28, 1978

[54] ELIMINATION OF FIBROUS POLYMERS
[75] Inventors: Edwin F. Peters, Winfield; David E. Boone, Lisle, both of Ill.
[73] Assignee: The Standard Oil Company, Chicago, Ill.
[21] Appl. No.: 752,519
[22] Filed: Dec. 20, 1976
[51] Int. Cl.$^2$ .................... C08F 4/64; C08F 10/02; C08F 10/06
[52] U.S. Cl. .................... 526/97; 526/114; 526/121; 526/124; 526/129; 526/156; 526/352
[58] Field of Search ............... 526/97, 114, 121, 124, 526/129, 156, 63

[56] References Cited

U.S. PATENT DOCUMENTS

| 3,397,195 | 8/1968 | Lukach et al. ............... 526/129 |
| 3,658,722 | 4/1972 | Delbouille et al. ............ 526/121 |
| 3,700,638 | 10/1972 | Kawasaki et al. ............. 526/97 |
| 3,759,884 | 9/1973 | Tokuzumi et al. ............. 526/124 |
| 3,951,935 | 4/1976 | Engelmann et al. ............ 526/129 |

FOREIGN PATENT DOCUMENTS

| 1,158,355 | 7/1969 | United Kingdom ............ 526/156 |
| 1,335,887 | 10/1973 | United Kingdom ............ 526/97 |

*Primary Examiner*—Alan Holler
*Attorney, Agent, or Firm*—Wallace L. Oliver; Arthur G. Gilkes; William T. McClain

[57] ABSTRACT

Adding a finely divided oxide to a terminal olefin polymerization catalyst comprising a hydrocarbon-soluble transition metal compound and a Group II or III metal organic compound reduces the amount of fibrous polymer produced.

10 Claims, No Drawings

ELIMINATION OF FIBROUS POLYMERS

BACKGROUND OF THE INVENTION

This invention relates to alpha-olefin polymerization and particularly relates to a catalyst system which eliminates the formation of fibrous polymer.

The polymerization of alpha-olefins to normally-solid, substantially crystalline polymers using hydrocarbon-soluble catalysts comprising transition metal halides, oxyhalides, alkyoxyhalides, aryloxyhalides, alkoxides or aryloxides and Group II or III metal organics is now well-known in the art. During olefin polymerization by such methods as the vapor phase polymerization process described in U.S. Pat. Nos. 3,957,448, 3,965,083, 3,970,611 and 3,971,768, incorporated herein by reference, or bulk or slurry processes, fibrous polymer can form which can tangle into a mass, referred to as a "bird's nest," which can force shutdown of the polymerization system. A method to eliminate the formation of such fibrous polymers and thus eliminate unnecessary plant shutdowns is needed in the industry.

SUMMARY OF THE INVENTION

In an olefin polymerization system using a catalyst prepared from a hydrocarbon-soluble transition metal compound and a Group II or III metal organic compound, the addition of a minor, effective amount of finely divided oxide reduces the amount of fibrous polymer produced.

BRIEF DESCRIPTION OF THE INVENTION

In alpha-olefin polymerizations, especially those in which the polymerization rate is very high, fibrous polymers can be produced which form tangled masses in the polymerization reactor system. We have found that in systems in which the polymerization catalyst comprises a component prepared from hydrocarbon soluble transition metal compound and a Group II–III metal organic, the inclusion of an effective minor amount of a finely divided oxide inhibits such fibrous polymer formation.

The amount of oxide required to inhibit fibrous polymer formation depends on the polymerization conditions such as the amount of transition metal containing component used. Generally, an effective amount ranges up to about 50 wt % of the total amount of transition metal containing component.

Examples of oxides which are useful in this invention are silica, alumina, titania, magnesia, zirconia, calcium oxide and mixtures thereof. The preferred oxides are silica, alumina and mixtures thereof. Generally, a suitable oxide has a high surface area and, besides reducing the amount of fibrous polymer, does not affect the polymerization. Typically, a white oxide is preferred so as not to impart color to the polymer, although if a colored polymer is desired, a colored oxide is suitable. A suitable oxide should have a particle size less than about 75 microns and preferably less than about 50 microns.

Although the exact mechanism of this invention is unknown, one theory is that during polymerization hydrocarbon-soluble transition metal compounds are leached from the supported catalysts and cause the formation of fibrous polymer. The oxide possibly acts as a scavenger for these hydrocarbon-soluble compounds and, thus, reduces fibrous polymer formation.

Data relating to silicas useful in this invention are shown in Table I.

Table I

|  | Silica | | | | |
|---|---|---|---|---|---|
|  | A | B | C | D | E[1] |
| Pore Volume (cc/g) | 1.00 | 1.70 | — | — | — |
| Surface Area (m²/g) | 600 | 350 | 200 | 300 | 380 |
| Av. Pore Diameter (nm) | 670 | 2000 | — | — | — |
| Bulk Density (lb/ft³) | 28 | 25 | ca. 7.8 | 2.5–3.5 | 2.5–3.5 |
| Particle Size (microns) | 54–65 | 54–65 | 10–40 | 5–20 | 3–15 |

[1] Aerosil 2491-380

The transition metal containing catalyst component with which this invention is useful generally is a hydrocarbon-soluble transition metal compound incorporated in or deposited on a suitable support. Examples of such supports are Group IIA, IIB or VIIB oxides, hydroxides, hydrous oxides, oxychlorides, alkoxides and halides which further may be reacted with an aluminum trihalide or aluminum alkyl chloride. Examples of suitable supports include magnesium hydroxide, zinc hydroxide, calcium hydroxide, manganese hydrous oxide, magnesium chloride and magnesium ethoxide. Typically these compounds are reacted with an aluminum trihalide such as aluminum trichloride. Suitable catalyst supports include magnesium hydroxide/aluminum trichloride, magnesium ethoxide/aluminum trichloride and magnesium ethoxide. Other supports include bivalent metal sulfites, nitrates, phosphates, silicates, carbonates and the like. The preparation of supported transition metal catalysts is known to the art.

Suitable hydrocarbon-soluble transition metal compounds include halides, oxyhalides, alkoxyhalides, aryloxyhalides, alkoxides or aryloxides of Group IVB, VB or VIB transition metals, such as titanium, vanadium, zirconium and chromium. Examples of such components are titanium tetrachloride, titanium tetrabromide, butoxytitanium trichloride, dibutoxytitanium dichloride, tetrabutyl titanate and vanadium tetrachloride, zirconium tetrachloride, and chromyl chloride.

Useful Group II–III metal organic promoters include trialkylaluminum, dialkylaluminum halides and mixtures thereof. Useful alkyl radicals contain from two to about six carbon atoms and useful halides are chloride and bromide. The preferable alkyl is ethyl and the preferable halide is chloride. The Group II–III metal typically is aluminum or magnesium. The preferable organo metallic is trialkyl aluminum and most preferably triethylaluminum. Other especially useful compounds include tripropyl aluminum, tributyl aluminum, triethyl aluminum/diethylaluminum chloride mixture and a 6:1 mixture of diethyl magnesium and triethyl aluminum.

The alpha-olefin polymerization systems in which this invention is useful include those in which fibrous polymers are formed. Generally, such alpha-olefins are ethylene, propylene and mixtures thereof. This invention is most useful in producing polymers of ethylene and copolymers of ethylene and propylene containing a minor amount of propylene.

This invention can be used in slurry, solution, solventless, or bulk polymerization systems known to the art. In a slurry or solution system, polymerization occurs in an inert hydrocarbon solvent such as an aliphatic alkane at pressures ranging from atmospheric to about 20,000 psig, preferably from about 30 to 1000 psig in a batch or continuous process. A typical solventless system in which olefin is polymerized from the vapor phase is described in U.S. Pat. Nos. 3,957,448, 3,965,083, 3,970,611, and 3,971,768, all incorporated by reference herein. Bulk polymerization utilizes the liquid monomer as a solvent and requires a temperature and pressure at which the monomer is liquid. Propylene can be polymerized under bulk conditions.

In the slurry process, typically the polymerization temperature is regulated such that polymer is formed as a solid in the reactor and preferably is about 40° C to 110° C. In a solution process, polymer is formed in a solution at a temperature of about 130° to 250° C and preferably about 150° to 200° C. In the solventless process, the preferred temperature range is from about 40° C to about 130° C and most preferably is about 60° C to 120° C.

The polymerization time depends on the process utilized. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvent used in the slurry or solution polymerization techniques includes aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono- and dialkylnaphthalenes, n-pentane, n-octane, isooctane and methyl cyclohexane. Preferably, liquid hydrocarbons are used; most preferably in slurry polymerizations, hexane is the polymerization medium. In solution polymerizations a higher boiling solvent is preferred such as a C-12 hydrocarbon. Although the nature of the solvent can be varied considerably, the solvent should be liquid under the reaction conditions and should be relatively inert. Advantageously, the solvent used can be purified prior to use by distillation or by reaction with an aluminum alkyl to remove impurities.

The olefin polymers which can be made using this invention include normally solid, substantially crystalline polymers of ethylene or propylene and copolymers thereof with up to about 20 mol percent of a terminal olefin having eight or fewer carbon atoms including alpha-olefins and dienes. This invention is most useful in polymerizing either ethylene or a mixture of ethylene with a minor amount of propylene. Such ethylene polymers and copolymers have weight average molecular weights ranging from about 10,000 to 1,000,000 and higher and typically range from about 15,000 to 500,000. The molecular weight can be controlled by methods known to the art such as by the use of hydrogen.

The olefin monomers should be substantially free of catalyst poisons such as water, oxygen, carbon dioxide and polar organic compounds. Preferably, the olefin is passed through a molecular sieve prior to polymerization.

Since the catalyst systems used in this invention are sensitive to oxygen and moisture, suitable precautions should be taken during catalyst preparation, transfer and use.

This invention is demonstrated by, but is not limited to, the following examples.

EXAMPLE I

Two polymerizations were made, one using this invention along with one comparative run. Into a 500 milliliter stirred autoclave were placed 2.6 milligrams of transition metal-containing catalyst, 260 milliliters of dry hexane and a measured amount of aluminum triethyl. Ethylene and hydrogen were introduced into the autoclave and their partial pressures maintained at 500 psig and 165 psig, respectively. After permitting the polymerization to continue for one hour at 180° F, the resulting polymeric product was removed from the reactor and washed with hexane. The results of the two polymerizations are shown in Table II. The transition metal-containing catalyst was prepared by first mixing 82 milliliters each of tetrabutyltitanate and titanium tetrachloride in one-half liter of benzene at room temperature overnight. This mixture was combined with the product of 41.2 grams of magnesium hydroxide and 71.2 grams of aluminum trichloride which had been refluxed in one liter of benzene for about 16 hours. After the combined mixture was refluxed for about 24 hours, 100 milliliters of the resulting catalyst slurry were washed with four one-liter portions of dry hexane.

Table II

| Ex. (Run) | Triethyl Aluminum (mg) | Silica (mg)[1] | Yield (g/g) | Melt Index (g/10 min.) | Polymer Appearance |
|---|---|---|---|---|---|
| (A) | 66 | None | 12,000 | 2.70 | Many fibers with some powder. |
| I | 88 | 2.5 | 15,000 | 2.65 | Few Fibers, mostly small particles. |

[1]Aerosil 2491-380

EXAMPLE II

In a one pound per hour continuous gas phase polymerization reactor similar to that described in U.S. Pat. No. 3,957,448, ethylene polymerizations were performed with and without the use of silica. The catalyst composition in such polymerizations was 250 milligrams $TiCl_2(OBu)_2$-$Mg(OH)_2$-$AlCl_3$ catalyst and 1900 milligrams triethyl aluminum. The transition metal-containing catalyst was prepared by first reacting 41.2 grams of magnesium hydroxide and 71.2 grams of aluminum trichloride in one liter of benzene at reflux for 23 hours. The resulting mixture refluxed for 16 hours was with the product of 1.4 milliliters of tetrabuty/titanate and 0.47 milliliter of tetrabutyltitanate and 0.47 milliliter of titanium tetrachloride which had been stirred at room temperature for 16 hours in 18 milliliters of benzene. The resulting catalyst slurry was washed with dry hexane. In the polymerization run performed without silica, fibrous polyethylene was formed which forced a shutdown in 4 to 6 hours. In the run in which 50 milligrams of Aerosil silica was added to the catalyst, the reactor ran for 34 hours without any fibrous polymer being formed. After which time the polymerization was continued without the use of the silica and immmediately fibrous polymer began forming which forced a shutdown 5 hours later.

We claim:

1. In a process for polymerizing alpha-olefins comprising contacting an alpha-olefin or mixtures thereof with a catalyst comprising an effective catalytic amount of a catalyst component prepared from (a) a hydrocarbon-soluble transition metal compound supported on a Group IIA, IIB or VIIB oxide, hydroxide, hydrous oxide, alkoxide or halide and (b) a Group II–III metal organic promoter, the improvement comprising adding to such catalyst an effective amount of a finely divided oxide such that fibrous polymer formation is inhibited.

2. The process of claim 1 wherein the oxide is silica, alumina, titania, magnesia, zirconia, calcium oxide or mixtures thereof.

3. The process of claim 1 wherein the alpha-olefin is ethylene, propylene or mixtures thereof.

4. The process of claim 1 wherein the oxide is silica, alumina or mixtures thereof.

5. The process of claim 1 wherein the hydrocarbon-soluble transition metal compound is titanium tetrachloride, titanium tetrabromide, butoxytitanium trichloride, dibutoxytitanium dichloride, tetrabutyl titanate, vanadium tetrachloride, zirconium tetrachloride or chromyl chloride.

6. The process of claim 1 wherein the transition metal compound is supported on magnesium hydroxide/aluminum trichloride, magnesium ethoxide/aluminum trichloride, magnesium chloride/or magnesium ethoxide.

7. The process of claim 6 wherein the hydrocarbon-soluble transition metal compound is titanium tetrachloride.

8. The process of claim 5 wherein the oxide is silica, alumina, or mixtures thereof.

9. The process of claim 7 wherein the oxide is silica, alumina, or mixtures thereof.

10. The process of claim 6 wherein the hydrocarbon-soluble transition metal compound is dibutoxytitanium dichloride.

* * * * *